Figure 1:
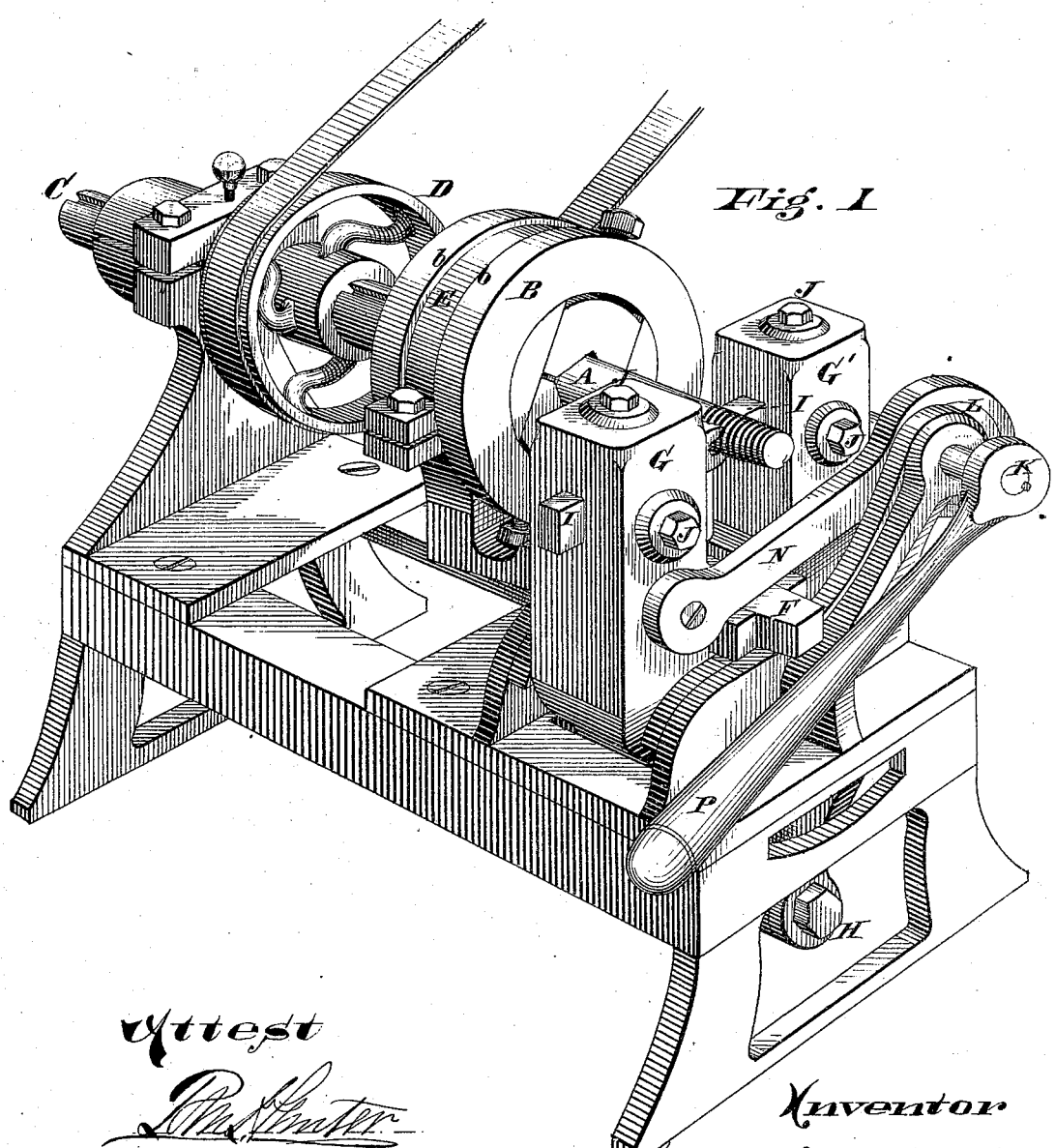

2 Sheets--Sheet 1.

J. L. HALL & H. MILLWARD.
Screw-Cutting Machines.

No. 150,687. Patented May 12, 1874.

2 Sheets--Sheet 2.
J. L. HALL & H. MILLWARD.
Screw-Cutting Machines.
No. 150,687. Patented May 12, 1874.
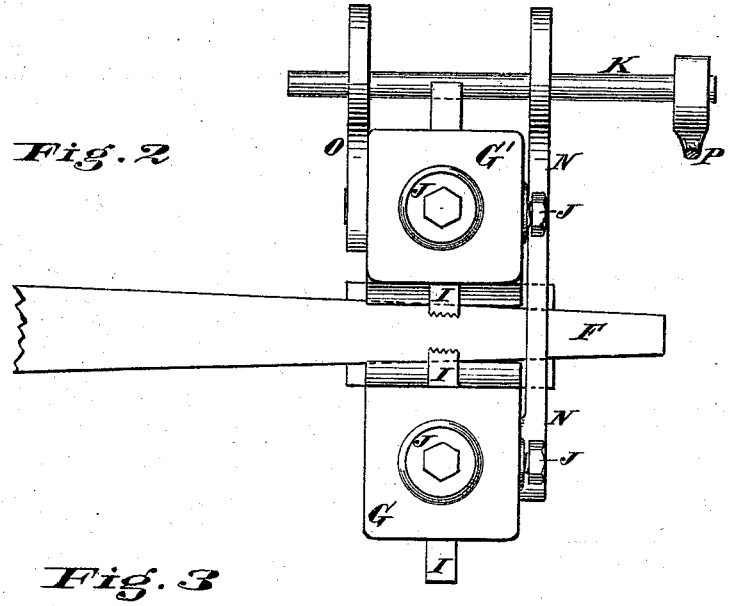
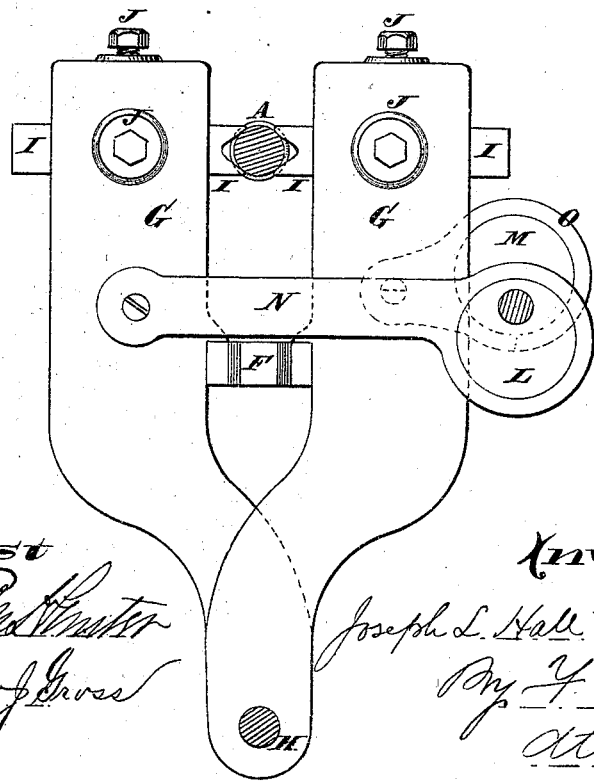
Attest
Inventors.
Joseph L. Hall & Henry Millward
By H. Millward
Attorney

UNITED STATES PATENT OFFICE.

JOSEPH L. HALL AND HENRY MILLWARD, OF CINCINNATI, OHIO.

IMPROVEMENT IN SCREW-CUTTING MACHINES.

Specification forming part of Letters Patent No. 150,687, dated May 12, 1874; application filed April 6, 1874.

*To all whom it may concern:*

Be it known that we, JOSEPH L. HALL and HENRY MILLWARD, both of Cincinnati, Hamilton county, State of Ohio, have invented a certain new and useful Improvement in Machines for Cutting Taps or Screws, of which the following is a specification:

Our invention consists of certain devices by which pressure may be brought to bear upon the dies in cutting the screw-thread upon a revolving taper "tap" or other taper object, while at the same time the pressure is prevented from forcing the dies beyond the required depth at any point of the length of the taper, the device consisting essentially of hinged or sliding dies, a sliding taper key for governing the depth of cut, and a lever and cams for pressing the dies against the taper key and the work to be cut.

Figure 1 is a perspective view of a machine embodying our invention. Fig. 2 is a plan, showing the double cams and guiding-wedge; and Fig. 3, an end view of the machine, showing the relative arrangement of the cams.

The taper tap A, or other object to have a taper screw cut upon it, is secured in a chuck, B, attached to a revolving lathe-spindle, C, driven by a pulley, D, or otherwise. In the periphery of the chuck or head B a circular groove, b, is cut for the reception of a two-part ring, E, which carries a taper gage, F. Two die-blocks, G G', are hinged together to the frame of the machine H, in the upper ends of which the dies I are adjustably fixed, being secured therein by screws J. In place of hinging the die-blocks G G', it is obvious that the same may be made to slide to and from the tap A with the same result. At the back of the machine a shaft, K, is journaled in projecting brackets, upon which shaft two cams, L M, are secured, the cam L connecting by link N to the die-block G, and the cam M connecting by link O to the die-block G'.

The throw of the cams being diametrically opposed to each other, as shown in Fig. 3, the partial rotation of the shaft K serves to move the die-carriers G G' in opposite directions to or from the tap A, and the cams may be operated by hand, (by means of lever P,) so that the dies may be forcibly drawn together, or may be opened to allow the tap to be withdrawn from between them.

It will be seen that at no point can the pressure inward carry the dies beyond the limitation fixed by the taper key F, which has a shape corresponding exactly to the required shape of the tap or screw to be cut.

In the operation of the machine, when the dies are brought together by the lever P, the revolution of the spindle C (in consequence of the cutting of the thread) carries the spindle and tap forward into the dies, and to the same extent also carries the key F forward, and as the operator presses the handle P this pressure causes the dies to cut the thread throughout the entire length of the taper required, the key F automatically opening the dies against the pressure of the lever as the work progresses. The spindle may of course be reversed, if necessary to cut backward, with the same result.

We claim—

The combination of the sliding spindle C, wedge E F, die-blocks G G' I, links N O, cams L M, shaft K, and lever P, operating substantially in the manner and for the purpose specified.

In testimony of which invention we hereunto set our hands.

JOSEPH L. HALL.
HENRY MILLWARD.

Witnesses:
N. ROFF,
FRANK B. TUCKER.